United States Patent [19]

Hausam

[11] 4,168,019
[45] Sep. 18, 1979

[54] GROUND COFFEE DISPENSER

[76] Inventor: Leonard P. Hausam, 6801 50th Ave. N., Crystal, Minn. 55428

[21] Appl. No.: 812,143

[22] Filed: Jul. 1, 1977

Related U.S. Application Data

[63] Continuation of Ser. No. 662,458, Mar. 1, 1976, abandoned.

[51] Int. Cl.² ............................................. G01F 11/18
[52] U.S. Cl. .................................... 222/185; 222/308; 222/354
[58] Field of Search ............... 222/307, 308, 361, 354, 222/355, 325, 531, 533, 181, 185, 180, 173; 221/281, 197, 198; 312/35, 38, 39, 284; 193/2 A; 198/538; 248/154; 232/43.2

[56] References Cited

U.S. PATENT DOCUMENTS

| Re. 8,054 | 1/1878 | Fawkes | 222/308 X |
| 466,895 | 1/1892 | Perkins | 248/154 X |
| 471,670 | 3/1892 | Jones et al. | 222/308 |
| 632,231 | 9/1899 | Blades | 221/198 X |
| 2,207,120 | 7/1940 | Greig | 222/361 X |
| 2,775,270 | 12/1956 | McKillop, Jr. | 222/354 X |
| 2,852,167 | 9/1958 | Lempart | 222/307 X |

FOREIGN PATENT DOCUMENTS 736834 9/1955 United Kingdom ................. 222/185

Primary Examiner—Robert J. Spar
Assistant Examiner—Edward M. Wacyra
Attorney, Agent, or Firm—John W. Adams

[57] ABSTRACT

A coffee dispenser having a storage hopper and an adjustable slide and trap door batch dispenser mechanism which can be easily and quickly cleaned and which is particularly adapted to permit adjustment of the size of the batch being dispensed.

6 Claims, 12 Drawing Figures

GROUND COFFEE DISPENSER

This is a continuation of application Ser. No. 662,458, filed Mar. 1, 1976, now abandoned.

It is an object of the present invention to provide a dispenser for coffee and other ground materials which is specifically adapted to accurately dispense adjustable, predetermined amounts of coffee into a brew basket for conventional coffee making machines.

It is a specific object to provide a batch coffee dispenser which can be quickly and easily cleaned and which has means for adjusting the size of the batch being dispensed.

The objects of the invention will more fully appear from the following description made in connection with the drawings in which.

Figure 1:
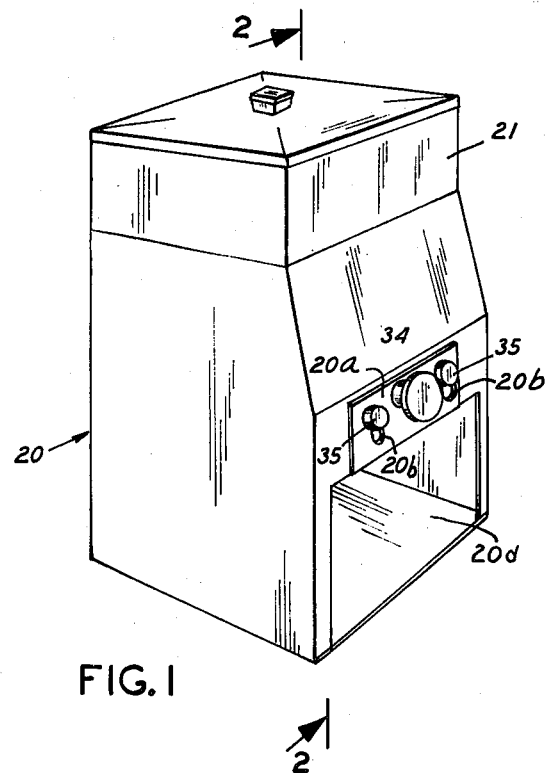
FIG. 1 is a perspective view showing a coffee dispenser embodying this invention.
Figure 2:
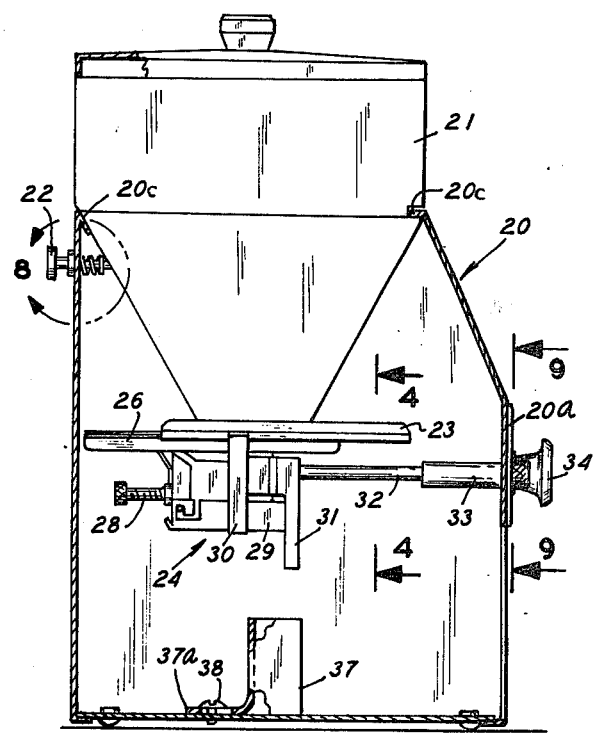
FIG. 2 is a vertical sectional view taken substantially along the line 2—2 of FIG. 1.
Figure 3:
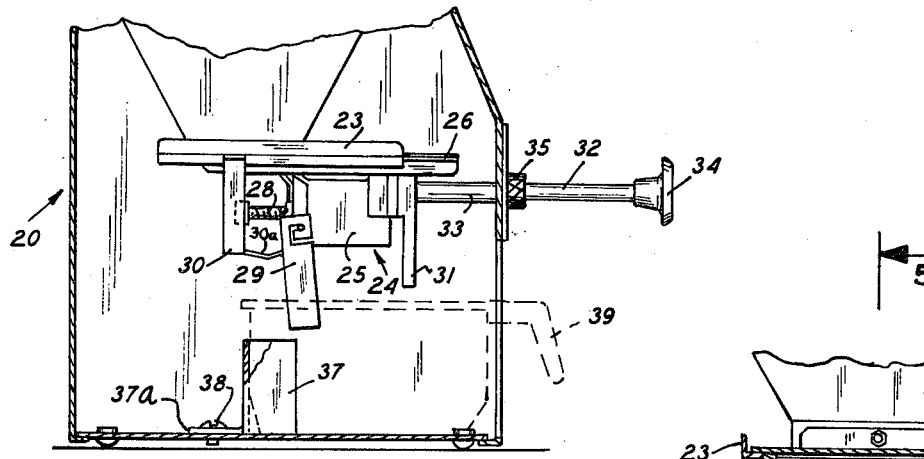
FIG. 3 is an enlarged fragmentary vertical section similar to FIG. 2, but showing the dispenser in dumping position.
Figure 4:
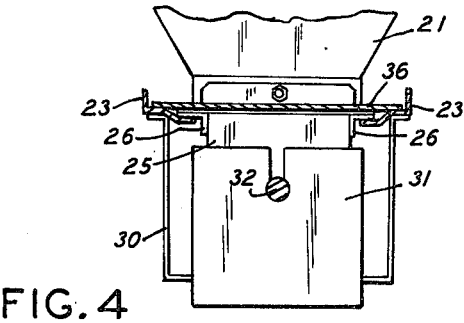
FIG. 4 is a fragmentary vertical sectional view taken substantially along the line 4—4 of FIG. 2.

Referring to FIG. 2, a storage hopper 21 extends into the top of a housing 20 and is detachably held in place on flanges 20c of housing 20 as by a spring loaded stop element 22 extending through housing 20 and into a suitable indentation or opening 21a in hopper 21. A pair of spaced guide rails 23 are attached in parallel aligned relation to opposite sides of the open bottom of hopper 21.

Figure 5:
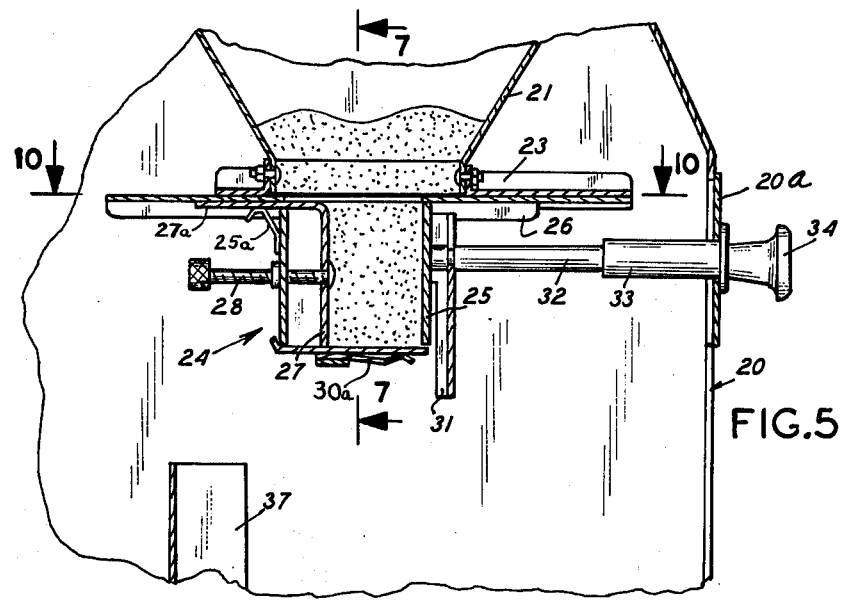
FIG. 5 is a fragmentary vertical sectional view taken substantially along the line 5—5 of FIG. 4.
Figure 6:
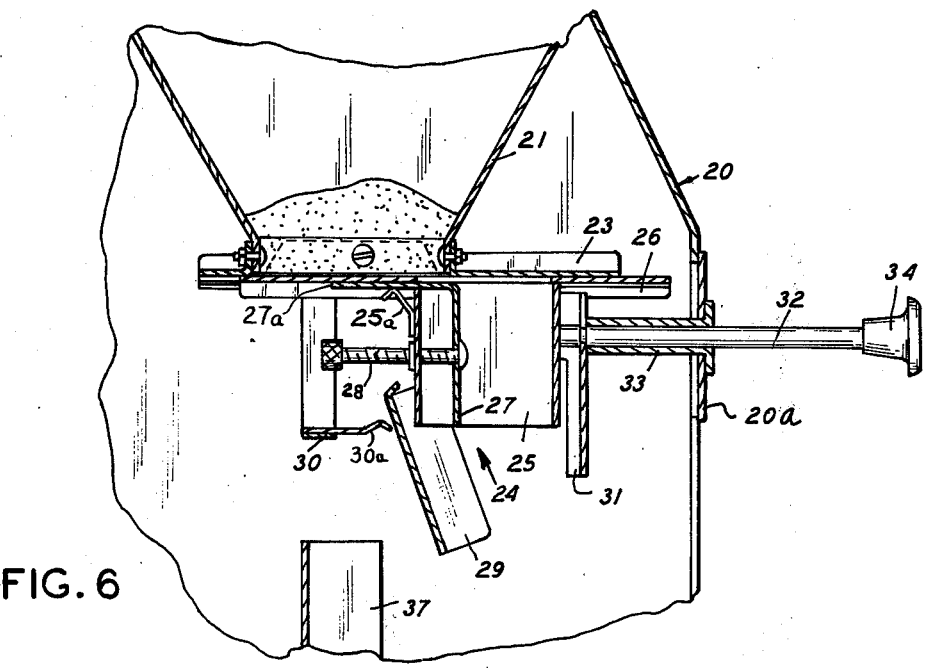
FIG. 6 is a similar view to FIG. 5 showing the dispenser after completion of the dumping operation.
Figure 7:
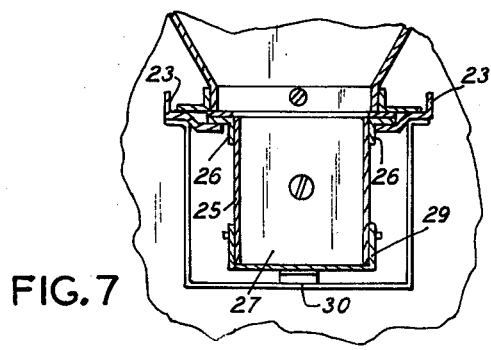
FIG. 7 is a vertical sectional view taken substantially along the line 7—7 of FIG. 5.
Figure 8:
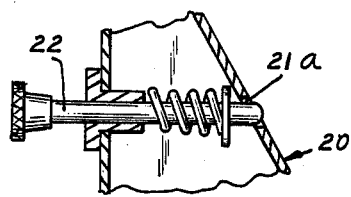
FIG. 8 is an enlarged fragmentary vertical sectional view showing the hopper locking mechanism.
Figure 9:
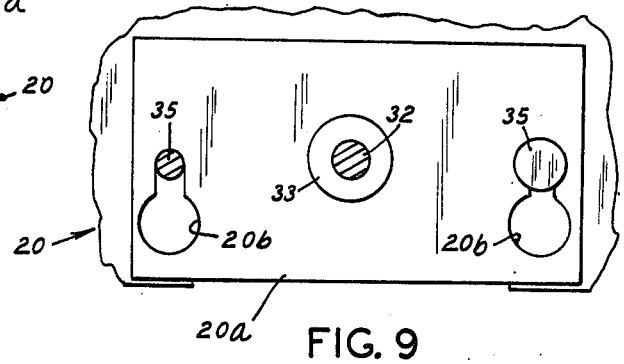
FIG. 9 is a vertical section taken substantially along line 9—9 of FIG. 2.
Figure 10:
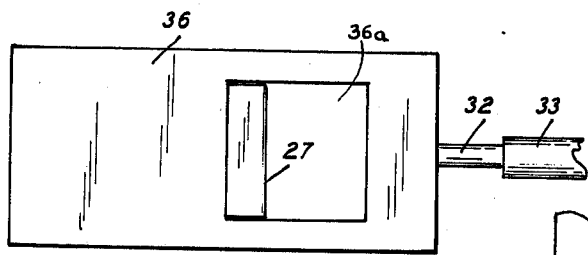
FIG. 10 is a fragmentary horizontal sectional view taken substantially along line 10—10 of FIG. 5 and showing the closure slide plate in top plan.
Figure 11:
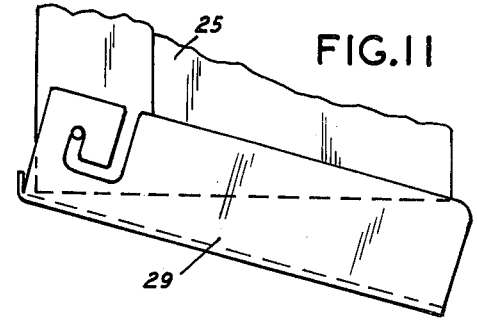
FIG. 11 is an enlarged fragmentary elevation of the trap door dumping mechanism.
Figure 12:
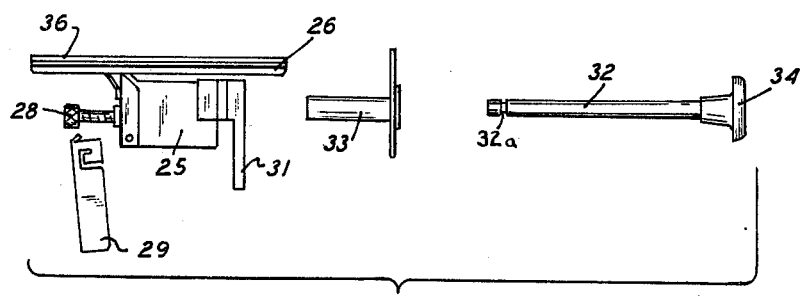
FIG. 12 is an exploded view of the slide and trap door dumping mechanism.

A slide and trap door batch dispenser 24 is shown in FIGS. 5-7 and includes a generally rectangular closure and slide plate 36 and guide flanges 26 which form a unit which is slidably mounted in the guide rails 23. The plate 36 is slightly wider than the open bottom of hopper 21 and has an opening 36a therein generally conforming in size with said open bottom of hopper 21. A generally rectangular batch measuring and receiving compartment 25 is attached to slide closure 36 and is aligned with the opening 36a in closure plate 36. A trap door 29 is pivotally mounted to the bottom of compartment 25. A batch adjusting plate 27 forms the back wall of compartment 25 and has a horizontal closure flange 27a which extends rearwardly under plate 36 in adjustable slidable relation thereto adjacent opening 36a. The width of element 27 is substantially equal to the inside of compartment 25. Element 27 is adjustably positioned inside compartment 25 by means of a thumb screw 28 threaded through the back panel of compartment 25 and is rotatably attached to the adjusting plate 27. The closure flange 27a is pressed upwardly into contact with plate 36 by a spring element 25a attached to said back panel of compartment 25. The dispenser 24 is slidably supported on guide rails 23 fixed to the bottom of the hopper 21. A trap door-closing camming spring 30a is mounted on a suitable bracket 30 fixed to said guide rails 23 and extending therebelow to position said spring 30a at approximately the same elevation as the bottom of the compartment 25. The spring 30a is constructed so when compartment 25 is in filling position the spring element 30a resiliently presses up against trap door 29 and holds door 29 closed against the bottom of compartment 25.

An attachment member 31 is fixed to the front panel of compartment 25 and is slotted to receive the peripheral groove 32a at the inner end of actuating rod 32. Said rod 32 extends through a bushing 33 fixed to a mounting and closure plate 20a and has a knob 34 attached to the other end. The closure plate 20a with its rod and bushing assembly is removably attached to the front of housing 20 as by the retaining pins 35 fixed to the housing and the keyhole slots 20b formed in the plate 20a.

A generally curved container stop 37 is positioned below the open bottom of hopper 21 and has a slotted attachment flange 37a which is adjustably attached to the floor of housing 20 by a screw 38.

In typical operation, ground coffee, or other ground material, is placed in hopper 21. Knob 34 is pushed rearwardly until it engages removable plate 20a, thereby aligning the filling opening 36a in closure plate 36 with the open bottom of hopper 21 and enabling the material in said hopper 21 to enter and fill compartment 25. A brew basket 39 or other suitable container is inserted through the access opening 20d in the front of housing 20 and is positioned under the dispenser 24 by engagement with the adjustable container stop 37. Knob 34 is then pulled out causing rod 32 to move dispenser 24 outwardly or forwardly along the rails 23. Spring element 30a extends forwardly a sufficient distance under trap door 29 so that said door will be held closed until the open bottom of hopper 21 is totally covered by closure plate 36. As trap door 29 moves out of contact with spring element 30a, the material contained in compartment 25 will be dumped into basket 39. The bushing 33 limits the distance dispenser 24 can move forwardly. After the measured batch in compartment 25 has been dumped, the rod 32 is pushed in to slide the dispenser 24 back along rails 23 with the compartment 25 aligned with the open bottom of hopper 21. The spring element 30a forces trap door 29 to swing up into closed position to allow the coffee to again fill compartment 25 with the next batch.

The amount of coffee, or other material, dispensed at each cycle of dispenser 24 is easily adjusted by turning thumb screw 28 which in turn moves adjusting plate 27 and varies the size of compartment 25. The entire dispenser 24 may be removed as a unit for cleaning and adjusting by lifting plate 20a and sliding the dispenser 24 unit out through the upper portion of opening 20D which extends upwardly behind the closure plate 20a in front of housing 20 and is of sufficient size to permit said dispenser unit 24 to pass therethrough. The hopper 21 can also be easily removed from housing 20 for cleaning by pulling the spring loaded stop pin 22 out of its locking position in the indentation 21a and then lifting hopper 21 out of the housing.

It will, of course, be understood that various changes may be made in the form, details, arrangement and proportions of the parts without departing from the scope of this invention as set forth in the appended claims.

What is claimed is:

1. A batch dispenser for finely divided materials, said dispenser comprising
   a housing,
   a hopper mounted in said housing and having a discharge opening in the bottom thereof,
   a material dispenser unit slidably mounted below said hopper opening and having a batch measuring compartment aligned with said discharge opening when in filling position, but being slidable into dumping position after being filled from said hopper, and being slidable beyond its dumping position to permit complete removability thereof from said hopper for cleaning,
   a trap door dumping element pivotally mounted below said compartment with closure means for normally closing the same when said unit is disposed in filling position,
   said closure means releasing said trap door dumping element when said unit is shifted into dumping position but closing said element when the unit is shifted back into filling position,
   means for sliding said unit and dumping element into dumping position and back into filling position and for removing said unit including said dumping element for cleaning,
   an access opening formed in the front of said housing to permit a batch receiving container to be inserted below said batch measuring compartment when in dumping position and said access opening extending upwardly a sufficient distance in said housing to permit said material dispenser unit to be removed from the bottom of said hopper to facilitate cleaning thereof,
   a removable closure plate formed across the upper portion of said access opening to retain said material dispenser unit in underlying relation to said hopper and within said housing while still permitting a batch receiving container to be inserted through said access opening below said closure plate,
   said means for sliding said dispensing unit and dumping element extending through the removable closure plate,
   said sliding means comprising,
   push rod means extending through the removable closure plate being removably connected to said unit and dumping element,
   knob means attached to the push rod means, and
   stop means coaxially mounted on the push rod means for limiting the distance said dispensing unit can slide to its dumping position.

2. The structure set forth in claim 1 and said trap door being mounted for sliding movement with said unit and said closure means comprising
   a spring camming element mounted in underlying relation to said trap door and positioned to close the same except when the unit is shifted therebeyond into dumping and removing positions.

3. The structure set forth in claim 1 and a pair of mounting rails fixed within said housing on a plane below the top of the removable closure plate, said unit including a closure plate slidably mounted in said rails and having a discharge opening formed therein disposed above said batch measuring compartment in fixed registration therewith and being in registration with the discharge opening of said hopper when said compartment is in batch receiving position,
   said closure plate having an imperforate portion closing said hopper opening whenever said trap door is released to pivot into dumping position.

4. The structure set forth in claim 1 and one of the side walls of said batch measuring compartment being movable into and out of said compartment to vary the size thereof and thus permit adjustment of the quantity of the measured batch.

5. The structure set forth in claim 1 and one side of said housing having an inwardly extending flange formed therein and the adjacent side of said hopper having a flange engaging shoulder for inner-fitting under said flange to interlock the adjacent sides of said hopper and said housing, and releasable means for connecting the housing and said hopper on the opposite sides thereof from said flange and said shoulder and for holding the shoulder in underlying relationship to said flange.

6. The structure set forth in claim 1 and an adjustable stop on the lower portion of said housing for positioning containers of various sizes in batch receiving position under said dispenser unit.

* * * * *